US011825385B2

(12) United States Patent
Navratil et al.

(10) Patent No.: US 11,825,385 B2
(45) Date of Patent: Nov. 21, 2023

(54) METHOD, SYSTEM AND APPARATUS FOR MULTICAST SESSION MANAGEMENT IN 5G COMMUNICATION NETWORK

(71) Applicant: Nokia Solutions and Networks Oy, Espoo (FI)

(72) Inventors: David Navratil, Helsinki (FI); Pekka Korja, Kauniainen (FI); Athul Prasad, Helsinki (FI); Mikko Säily, Laukkoski (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/772,092

(22) PCT Filed: Dec. 12, 2017

(86) PCT No.: PCT/EP2017/082480
§ 371 (c)(1),
(2) Date: Jun. 11, 2020

(87) PCT Pub. No.: WO2019/114393
PCT Pub. Date: Jun. 20, 2019

(65) Prior Publication Data
US 2021/0076164 A1    Mar. 11, 2021

(51) Int. Cl.
*H04W 4/06* (2009.01)
*H04M 15/00* (2006.01)
*H04W 72/30* (2023.01)

(52) U.S. Cl.
CPC ............. *H04W 4/06* (2013.01); *H04M 15/66* (2013.01); *H04W 72/30* (2023.01)

(58) Field of Classification Search
CPC ..... H04W 4/06; H04W 72/005; H04M 15/66; H04L 12/189
See application file for complete search history.

(56) References Cited

U.S. PATENT DOCUMENTS

2004/0185837 A1* 9/2004 Kim ...................... H04L 12/189
455/414.3
2006/0109812 A1* 5/2006 Kim .................. H04L 29/12292
370/329

(Continued)

OTHER PUBLICATIONS

"3rd Generation Partnership Project; Technical Specification Group Services and System Aspects; Study on the security aspects of the next generation system (Release 14)", 3GPP Standard; Technical Report; 3GPP TR 33.899, 3rd Generation Partnership Project (3GPP), Mobile Competence Centre ; 650, Route Des Lucioles ; F-06921 Sophia-Antipolis Cedex ; France, vol. SA WG3, No. V1.3.0, Aug. 21, 2017 (Aug. 21, 2017), pp. 1-605, XP051450230, the whole document.

3rd Generation Partnership Project; Technical Specification Group Services and System Aspects; Multimedia Broadcast/Multicast Service (MBMS); (Release 14), 3GPP TS 23.246 V14.2.0 (Sep. 2017). (76 pages).

(Continued)

*Primary Examiner* — Abdullahi Ahmed
(74) *Attorney, Agent, or Firm* — Mintz Levin Cohn Ferris Glovsky and Popeo, P.C.

(57) ABSTRACT

An apparatus in a network function comprising at least one processor and at least one memory including computer code for one or more programs, the at least one memory and the computer code configured, with the at least one processor, to cause the apparatus at least to: determine that a protocol data unit session for a user equipment is to be updated to add or modify multicast information; and provide multicast context information associated with said user equipment which causes said user equipment to receive multicast data associated with said multicast context information.

14 Claims, 10 Drawing Sheets

(56) References Cited

U.S. PATENT DOCUMENTS

| | | | | |
|---|---|---|---|---|
| 2007/0136762 | A1* | 6/2007 | Zhang | H04W 12/084 |
| | | | | 725/62 |
| 2007/0232308 | A1* | 10/2007 | Bergstrom | H04W 76/40 |
| | | | | 455/436 |
| 2009/0113487 | A1* | 4/2009 | Nanjunda Swamy | |
| | | | | H04L 12/189 |
| | | | | 725/62 |
| 2012/0178457 | A1* | 7/2012 | Liao | H04W 76/18 |
| | | | | 455/437 |
| 2013/0279395 | A1* | 10/2013 | Aramoto | H04W 72/005 |
| | | | | 370/312 |
| 2015/0304118 | A1* | 10/2015 | Janneteau | H04L 12/189 |
| | | | | 370/312 |
| 2018/0092133 | A1* | 3/2018 | Starsinic | H04W 76/40 |
| 2018/0242387 | A1* | 8/2018 | El Khayat | H04W 76/40 |
| 2019/0158408 | A1* | 5/2019 | Li | H04L 67/104 |
| 2020/0267513 | A1* | 8/2020 | Zhu | H04L 65/1033 |

OTHER PUBLICATIONS

3rd Generation Partnership Project; Technical Specification Group Services and System Aspects; System Architecture for the 5G System; Stage 2; (Release 15), 3GPP TS 23.501 v1.4.0 (Sep. 2017). (151 pages).

3rd Generation Partnership Project; Technical Specification Group Services and System Aspects; Procedures for the 5G System; Stage 2; (Release 15), 3GPP TS 23.502 v1.2.0 (Sep. 2017). (165 pages).

3rd Generation Partnership Project; Technical Specification Group Core Network and Terminals; GPRS Tunnelling Protocol (GTP) specification for Gateway Location Register (GLR); (Release 14), 3GPP TS 29.119 v14.0.0 (Mar. 2017). (11 pages).

3rd Generation Partnership Project; Technical Specification Group Core Network and Terminals; Group Communication System Enablers for LTE (GCSE_LTE); MB2 Reference Point; Stage 3; (Release 15), 3GPP TS 29.468 v15.1.0 (Sep. 2017). (38 pages).

* cited by examiner

333# METHOD, SYSTEM AND APPARATUS FOR MULTICAST SESSION MANAGEMENT IN 5G COMMUNICATION NETWORK

This application is a national phase entry of Patent Cooperation Treaty Application No. PCT/EP2017/082480 filed Dec. 12, 2017, entitled "METHOD, SYSTEM AND APPARATUS FOR MULTICAST SESSION MANAGEMENT IN 5G COMMUNICATION NETWORK," the disclosure of which is incorporated herein by reference in its entirety.

FIELD

The present application relates to a method, apparatus, system and computer program and in particular but not exclusively to a method and apparatus for multicast session management in a 5G or New Radio (NR) communications network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio), long-term evolution (LTE) of the Universal Mobile Telecommunications System (UMTS), and now 5G New Radio (NR) radio-access technology with 5G Core Network (5GC). 5G NR is being standardized by the 3rd Generation Partnership Project (3GPP).

Multicast and broadcast in cellular networks is an area of discussion. Multicast session definition and management architecture for delivering content using multicast/broadcast in LTE-Advanced networks are known. Here wide-area delivery of content using multicast/broadcast is implemented using multicast broadcast single frequency networks (MBSFN) areas where the same content is delivered over the air using synchronized time-frequency physical resources. For delivery of such content to a smaller area, single cell-point-to-multipoint (SC-PTM) technology was developed.

SUMMARY

According to an aspect, there is provided a an apparatus comprising at least one processor and at least one memory including computer code for one or more programs, the at least one memory and the computer code configured, with the at least one processor, to cause the apparatus at least to: determine that a protocol data unit session for a user equipment is to be updated to add or modify multicast information; and provide multicast context information associated with said user equipment.

The apparatus may be configured to receive a request caused by the user equipment, said request initiating the updating of the protocol data unit session of that user equipment.

The request may comprise information about an interest of said user equipment to receive data from a multicast group.

The request may comprise a protocol data unit session update request.

The apparatus may be configured to initiate the updating of the protocol data unit session of the user equipment.

The apparatus may be configured to initiate the updating of the protocol data unit session in response to a policy and control function.

The apparatus may be configured to initiate the updating of the protocol data unit session in response to modification of a policy.

The apparatus may be configured to initiate the updating of the protocol data unit session in response to an update of subscription data.

The apparatus may be configured to initiate the updating of the protocol data unit session in response to a trigger event.

The trigger event may comprise a quality of service related event.

The apparatus may be configured to determine that the protocol data unit session for the user equipment is to be updated n in response to an access node initiated modification.

The apparatus may be configured to receive information about a user plane event and in response to receiving said event determining that said protocol data session is to be updated.

The user plane event may comprise reception of a multicast listener report.

The apparatus may be configured to determine if a multicast context for an identified multicast group exists.

When said apparatus determines that the multicast context for the identified multicast group does not exist in the network, the apparatus may be configured to create a multicast context for the identified multicast group.

The apparatus may be configured to determine if the apparatus has multicast context for an identified multicast group.

The apparatus may be configured to fetch at least one of multicast subscription data and multicast context data.

The apparatus may be configured to cause a multicast context to be created.

The apparatus may be configured to transmit a session management update message with multicast context information comprising at least of: session management information for at least one radio access node and at least one user equipment.

The session management information may comprise at least one of: a multicast packet data unit identifier, a session identifier, at least one quality of service profile, core network tunnel information, a single network slice selection assistance information, session-AMBR information; a multicast packet data unit identifier, a session identifier, at least one quality of service profile, session-AMBR information and at least one of a multicast group identifier.

The session management information may comprise at least one of: a protocol data unit session identifier, a multicast identifier associated with a multicast group, at least one quality of service profile, core network tunnel information, a single network slice selection assistance information, and session-AMBR information.

The session management information may comprise in a first container at least one of: a protocol data unit session identifier, a multicast identifier associated with a multicast group, at least one quality of service profile, core network tunnel information, a single network slice selection assistance information, and session-AMBR information.

The multicast context identifier may be associated with a multicast context of multicast group.

The session management information may comprise in a second container at least one of: a protocol data unit session identifier, a multicast identifier of a multicast group, at least one quality of service profile, and session-AMBR information.

The apparatus may be provided in a session management function.

According to another aspect, there is provided an apparatus comprising at least one processor and at least one memory including computer code for one or more programs, the at least one memory and the computer code configured, with the at least one processor, to cause the apparatus at least to: provide information about a user plane event for a user equipment when a protocol data session is to be updated for the user equipment to add or modify multicast information; and receive a session establishment or modification request associated with the multicast information.

The user plane event may comprise reception of a multicast listener report.

The apparatus may be provided in a user plane function.

According to another aspect, there is provided an apparatus in an access node comprising at least one processor and at least one memory including computer code for one or more programs, the at least one memory and the computer code configured, with the at least one processor, to cause the apparatus at least to: receive a session establishment or modification request associated with multicast information for a at least one user equipment; establish a tunnel with a user plane function using the said multicast information; receive from a user plane function data for multicasting/broadcasting; and transmit using a set of radio bearers the data for multicasting/broadcasting to the at least one user equipment, the at least one user equipment identified in the session establishment or modification request as being interested in receiving data from a multicasting/broadcasting group associated with the data for multicasting/broadcasting.

The apparatus may be configured to cause a message to be transmitted comprising session management information when a least one quality of service target cannot be fulfilled.

According to another aspect, there is provided an apparatus in a user equipment comprising at least one processor and at least one memory including computer code for one or more programs, the at least one memory and the computer code configured, with the at least one processor, to cause the apparatus at least to: cause a request to be sent indicating at least an interest to receive multicast data; and receive a session management update message with multicast information comprising at least an indication that a multicast context has been one of added and created.

The request may be at least one of: a protocol data unit session modification request; and a user plane packet comprising at least an indication of at least an interest to receive multicast data.

The apparatus may be configured to cause the protocol data unit session modification request to be sent in response to a multicast listener report for which said user equipment does not have the associated multicast context.

The apparatus may be configured to receive a multicast listener report after a multicast context has been one of added and created and then to discard the multicast listener report.

According to another aspect there is provided an apparatus in a user equipment comprising at least one processor and at least one memory including computer code for one or more programs, the at least one memory and the computer code configured, with the at least one processor, to cause the apparatus at least to: receive a session management update message with multicast information comprising at least an indication that a multicast context has been one of added and created; receive a multicast listener report after a multicast context has been one of added and created; and discard the multicast listener report.

According to another aspect, there is provided a method comprising: determining that a protocol data unit session for a user equipment is to be updated to add or modify multicast information; and providing multicast context information associated with said user equipment.

The method may comprise receiving a request caused by the user equipment, said request initiating the updating of the protocol data unit session of that user equipment.

The request may comprise information about an interest of said user equipment to receive data from a multicast group.

The request may comprise a protocol data unit session update request.

The method may comprise initiating the updating of the protocol data unit session the user equipment.

The method may comprise initiating the updating of the protocol data unit session in response to a policy and control function.

The method may comprise initiating the updating of the protocol data unit session in response to modification of a policy.

The method may comprise initiating the updating of the protocol data unit session in response to an update of subscription data.

The method may comprise initiating the updating of the protocol data unit session in response to a trigger event.

The trigger event may comprise a quality of service related event.

The method may comprise determining that the protocol data unit session for the user equipment is to be updated in response to an access node initiated modification.

The method may comprise receiving information about a user plane event and in response to receiving said event determining that said protocol data session is to be updated.

The user plane event may comprise reception of a multicast listener report.

The method may comprise determining if the apparatus has multicast context for an identified multicast group.

The method may comprise determining if a multicast context for an identified multicast group exists.

When it is determined that the multicast context for the identified multicast group does not exist in the network, the method may comprise creating a multicast context for the identified multicast group.

The method may comprise fetching at least one of multicast subscription data and multicast context data.

The method may comprise causing a multicast context to be created.

The method may comprise transmitting a session management update message with multicast context information comprising at least of: session management information for at least one radio access node and at least one user equipment.

The session management information may comprise at least one of: a multicast packet data unit identifier, a session identifier, at least one quality of service profile, core network tunnel information, a single network slice selection assistance information, session-AMBR information; a multicast packet data unit identifier, a session identifier, at least one quality of service profile, session-AMBR information and at least one of a multicast group identifier.

The session management information may comprise at least one of: a protocol data unit session identifier, a multicast identifier associated with a multicast group, at least one quality of service profile, core network tunnel information, a single network slice selection assistance information, and session-AMBR information.

The session management information may comprise in a first container at least one of: a protocol data unit session identifier, a multicast identifier associated with a multicast group, at least one quality of service profile, core network tunnel information, a single network slice selection assistance information, and session-AMBR information.

The multicast context identifier may be associated with a multicast context of multicast group.

The session management information may comprise in a second container at least one of: a protocol data unit session identifier, a multicast identifier of a multicast group, at least one quality of service profile, and session-AMBR information.

The method may be performed in a session management function.

According to another aspect, there is provided a method comprising: providing information about a user plane event for a user equipment when a protocol data session is to be updated for the user equipment to add or modify multicast information; and receiving a session establishment or modification request associated with the multicast information.

The user plane event may comprise reception of a multicast listener report.

The method may be performed in a user plane function.

According to another aspect, there is provided a method comprising: receiving a session establishment or modification request associated with multicast information for a at least one user equipment; establishing a tunnel with a user plane function using the said multicast information; receiving from a user plane function data for multicasting/broadcasting; and transmitting using a set of radio bearers the data for multicasting/broadcasting to the at least one user equipment, the at least one user equipment identified in the session establishment or modification request as being interested in receiving data from a multicasting/broadcasting group associated with the data for multicasting/broadcasting.

The method may comprise causing a message to be transmitted comprising session management information when a least one quality of service target cannot be fulfilled.

According to another aspect, there is provided a method comprising: causing a request to be sent indicating at least an interest to receive multicast data; and receiving a session management update message with multicast information comprising at least an indication that a multicast context has been one of added and created.

The request may be at least one of: a protocol data unit session modification request; and a user plane packet comprising at least an indication of at least an interest to receive multicast data.

The method may comprise causing the protocol data unit session modification request to be sent in response to a multicast listener report for which said user equipment does not have the associated multicast context.

The method may comprise receiving a multicast listener report after a multicast context has been one of added and created and then to discard the multicast listener report.

According to another aspect there is provided a method comprising: receiving a session management update message with multicast information comprising at least an indication that a multicast context has been one of added and created; receiving a multicast listener report after a multicast context has been one of added and created; and discarding the multicast listener report.

According to another aspect, there is provided an apparatus comprising: means for determining that a protocol data unit session for a user equipment is to be updated to add or modify multicast information; and means for providing multicast context information associated with said user equipment.

The apparatus may comprise means for receiving a request caused by the user equipment, said request initiating the updating of the protocol data unit session of that user equipment.

The request may comprise information about an interest of said user equipment to receive data from a multicast group.

The request may comprise a protocol data unit session update request.

The apparatus may comprise means for initiating the updating of the protocol data unit session of the user equipment.

The apparatus may comprise means for initiating the updating of the protocol data unit session in response to a policy and control function.

The apparatus may comprise means for initiating the updating of the protocol data unit session in response to modification of a policy.

The apparatus may comprise means for initiating the updating of the protocol data unit session in response to an update of subscription data.

The apparatus may comprise means for initiating the updating of the protocol data unit session in response to a trigger event.

The trigger event may comprise a quality of service related event.

The apparatus may comprise means for determining that the protocol data unit session for the user equipment is to be updated in response to an access node initiated modification.

The apparatus may comprise means for receiving information about a user plane event and in response to receiving said event determining that said protocol data session is to be updated.

The user plane event may comprise reception of a multicast listener report.

The apparatus may comprise means for determining if a multicast context for an identified multicast group exists.

When it is determined that the multicast context for the identified multicast group does not exist in the network, the apparatus may comprise means for creating a multicast context for the identified multicast group.

The apparatus may comprise means for determining if the apparatus has multicast context for an identified multicast group.

The apparatus may comprise means for fetching at least one of multicast subscription data and multicast context data.

The apparatus may comprise means for causing a multicast context to be created.

The apparatus may comprise means for transmitting a session management update message with multicast context information comprising at least of: session management information for at least one radio access node and at least one user equipment.

The session management information may comprise at least one of: a multicast packet data unit identifier, a session identifier, at least one quality of service profile, core network tunnel information, a single network slice selection assistance information, session-AMBR information; a multicast packet data unit identifier, a session identifier, at least one quality of service profile, session-AMBR information and at least one of a multicast group identifier.

The session management information may comprise at least one of: a protocol data unit session identifier, a multicast identifier associated with a multicast group, at least one quality of service profile, core network tunnel information, a single network slice selection assistance information, and session-AMBR information.

The session management information may comprise in a first container at least one of: a protocol data unit session identifier, a multicast identifier associated with a multicast group, at least one quality of service profile, core network tunnel information, a single network slice selection assistance information, and session-AMBR information.

The multicast context identifier may be associated with a multicast context of multicast group.

The session management information may comprise in a second container at least one of: a protocol data unit session identifier, a multicast identifier of a multicast group, at least one quality of service profile, and session-AMBR information.

The apparatus may be provided in a session management function.

According to another aspect, there is provided an apparatus comprising: means for providing information about a user plane event for a user equipment when a protocol data session is to be updated for the user equipment to add or modify multicast information; and means for receiving a session establishment or modification request associated with the multicast information.

The user plane event may comprise reception of a multicast listener report.

The apparatus may be provided in a user plane function.

According to another aspect, there is provided an apparatus comprising: means for receiving a session establishment or modification request associated with multicast information for a at least one user equipment; means for establishing a tunnel with a user plane function using the said multicast information; means for receiving from a user plane function data for multicasting/broadcasting; and means for transmitting using a set of radio bearers the data for multicasting/broadcasting to the at least one user equipment, the at least one user equipment identified in the session establishment or modification request as being interested in receiving data from a multicasting/broadcasting group associated with the data for multicasting/broadcasting.

The apparatus may comprise means for causing a message to be transmitted comprising session management information when a least one quality of service target cannot be fulfilled.

According to another aspect, there is provided an apparatus comprising: means for causing a request to be sent indicating at least an interest to receive multicast data; and means for receiving a session management update message with multicast information comprising at least an indication that a multicast context has been one of added and created.

The request may be at least one of protocol data unit session modification request and a user plane packet comprising at least an indication of at least an interest to receive multicast data.

The apparatus may comprise means for causing the protocol data unit session modification request to be sent in response to a multicast listener report for which said user equipment does not have the associated multicast context.

The apparatus may comprise means for receiving a multicast listener report after a multicast context has been one of added and created and then to discard the multicast listener report.

According to another aspect there is provided an apparatus comprising: means for receiving a session management update message with multicast information comprising at least an indication that a multicast context has been one of added and created; means for receiving a multicast listener report after a multicast context has been one of added and created; and means for discarding the multicast listener report.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Some embodiments as discussed in further detail may be in the context of multicast session definition and management in for example 3GPP 5G architecture.

Before explaining in detail the examples, certain general principles of a wireless communication system and mobile communication devices are briefly explained with reference to FIGS. 1 to 2 to assist in understanding the technology underlying the described examples.

Figure 1:
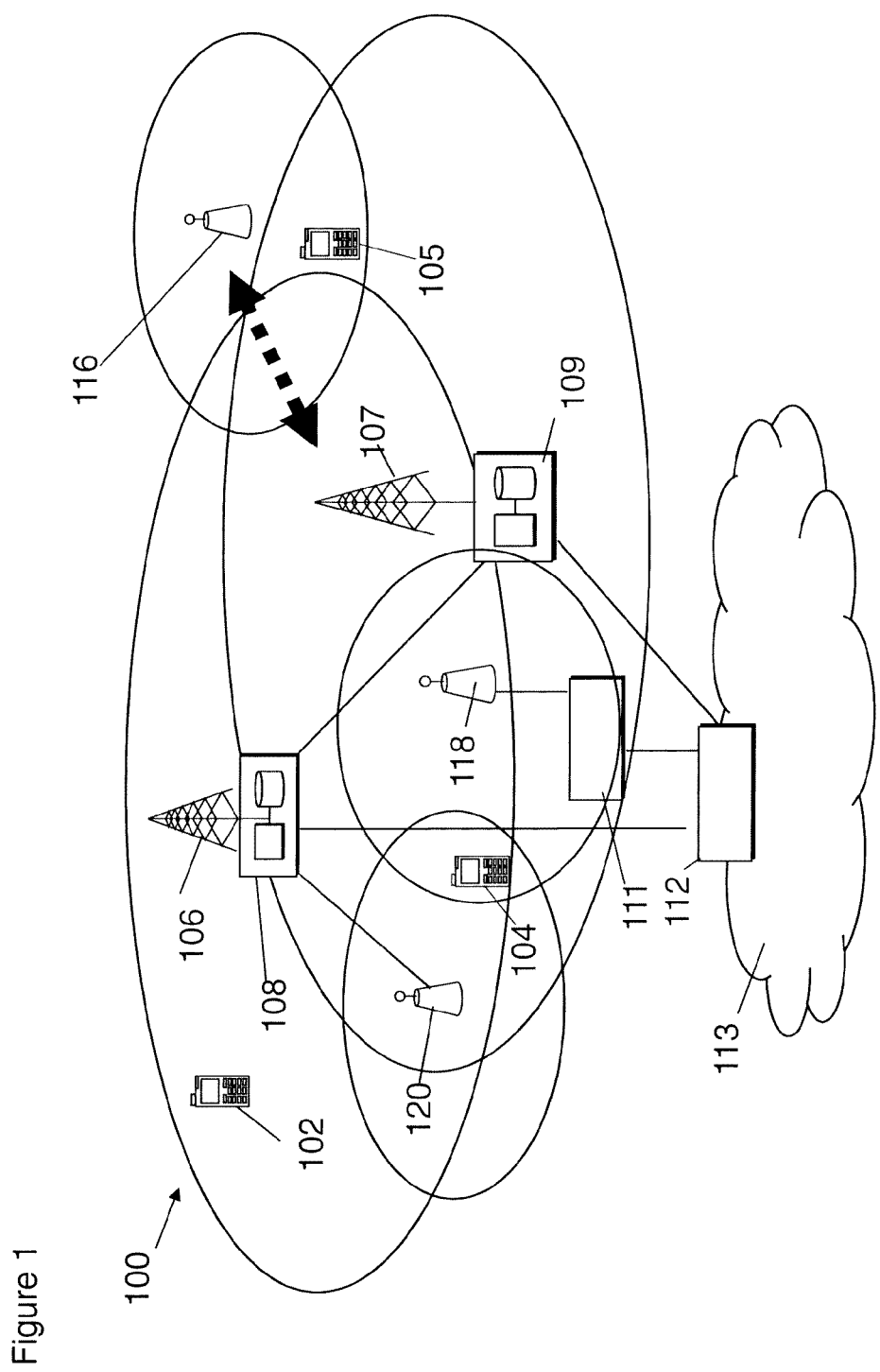
FIG. 1 shows a schematic diagram of an example communication system comprising a plurality of base stations and a plurality of communication devices.

In a wireless communication system 100, such as that shown in FIG. 1, mobile communication devices or user equipment (UE) 102, 104, 105 are provided wireless access via at least one access point or similar wireless transmitting and/or receiving node or point. An access point or base station is referred to as a Node B or generally NB (for example an eNB in LTE and gNB in 5G NR). Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

LTE (and 5G) systems may however be considered to have a so-called "flat" architecture, without the provision of RNCs; rather the NB is in communication with a system architecture evolution gateway (SAE-GW) and a mobility management entity (MME), which entities may also be pooled meaning that a plurality of these nodes may serve a plurality (set) of NBs. Each UE is served by only one MME and/or S-GW at a time and the NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations (or relay nodes or RN) 116, 118 and 120 may also be connected to the network 113, for example by a separate gateway function and/or via the controllers of the macro level stations. The base stations 116, 118 and 120 may be pico or femto level base stations or the like. In the example, station 118 is connected via a gateway 111 whilst station 120 connects via the controller apparatus 108. The station 116 may be connected via station 107 as will be explained in further detail hereafter. In some embodiments, the smaller stations may not be provided.

Figure 2:
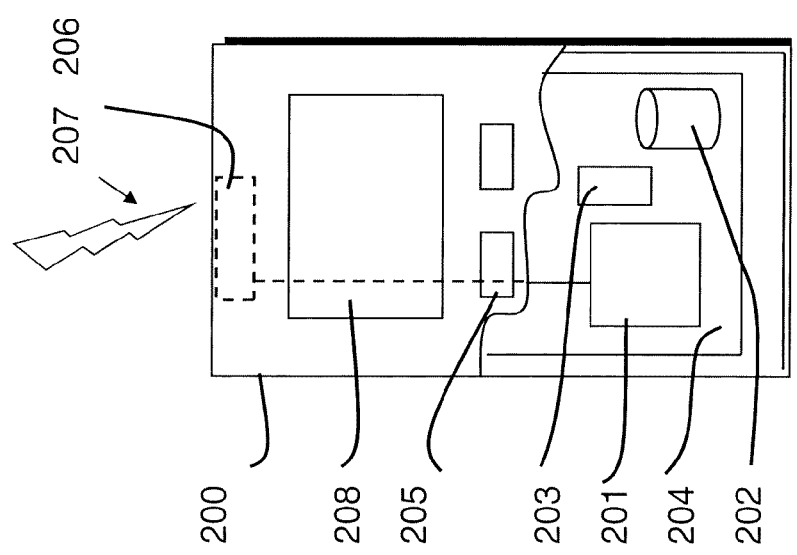
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

Figure 3:
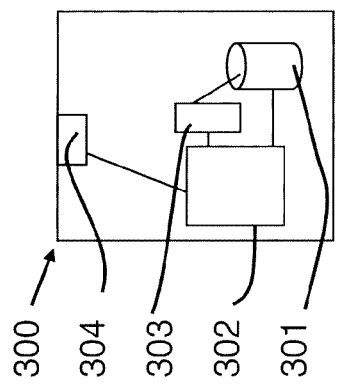
FIG. 3 shows a schematic diagram of an example control apparatus.

An example control apparatus (and/or base station) is shown in FIG. 3. FIG. 3 shows an example of a control apparatus provided in any of the various functions discussed later in relation to FIGS. 5, 6 and 7. The control apparatus 300 comprises at least one memory 301, at least one data processing unit 302, 303 and an input/output interface 304.

The control apparatus 300 or processor 302/303 can be configured to execute an appropriate software code to provide the control functions.

An example of wireless communication systems are architectures standardized by the 3rd Generation Partnership Project (3GPP). The currently being developed 3GPP based development, release 15, is often referred to as the 5G or NR standards part of long term evolution (LTE) or LTE Advanced Pro of the Universal Mobile Telecommunications System (UMTS) radio-access technology. Other examples of radio access system comprise those provided by base stations of systems that are based on technologies such as wireless local area network (WLAN) and/or WiMax (Worldwide Interoperability for Microwave Access).

As discussed earlier one of the aspects of these wireless communications systems is multicast/broadcast operations over cellular networks. With respect to FIG. 4 an architecture proposed for delivering content using multicast/broadcast in LTE-Advanced networks is shown.

The architecture shows a content provider 401 generating suitable multicast/broadcast content which is forwarded to a broadcast multicast service centre (BMSC) 403 for broadcast/multicast output and to a packet data gateway (P-GW) 405 for unicast output.

The packet data gateway (P-GW) 405 is the link between the mobile device and the services that reside in an external packet network such as the content provider 401. The P-GW 405 may communicate with a serving gateway (S-GW) 407.

The S-GW 407 is the gateway which terminates the interface towards E-UTARN. For each UE at given point of time, there is a single S-GW. The S-GW is further in communication with the eNB 409.

The eNB 409 can receive the content from the S-GW 407 and forward it to the UE 410 over a unicast 402 path.

The architecture further shows a broadcast multicast service centre (BMSC) 403 which is in communication with a multimedia broadcast multicast services-gateway (MBMS-GW) 411.

The MBMS-GW 411 may be in further communication with an eNB 413 for providing a single cell point to multipoint (SC-PTM) link 404 to an UE 420 or a multicast-broadcast single-frequency network (MBSFN) link in MBSFN area when all cells of MBSFN area are controlled by a single eNB.

The MBMS-GW 411 may also be in communication with a series of eNBs 419₁, 419₂, 419₃ which form a multicast-broadcast single-frequency network (MBSFN) area 421 and which communicate to UEs 406 within the MBSFN area the content provided by the content provider.

Also the MBMS-GW 411 may also be in communication with a mobility management entity (MME) 415. The MME deals with the control plane and handles the signalling related to mobility and security for E-UTRAN access. The MME is in communication with a multi-cell/multicast coordination entity (MCE) 417.

The MCE 417 is a functional entity providing functions for admission control and allocation of radio resources by the E-UTRAN and for MBMS session control and is configured to control the eNBs 419₁, 419₂, 419₃ which form a multicast-broadcast single-frequency network (MBSFN) area 421.

Figure 4:
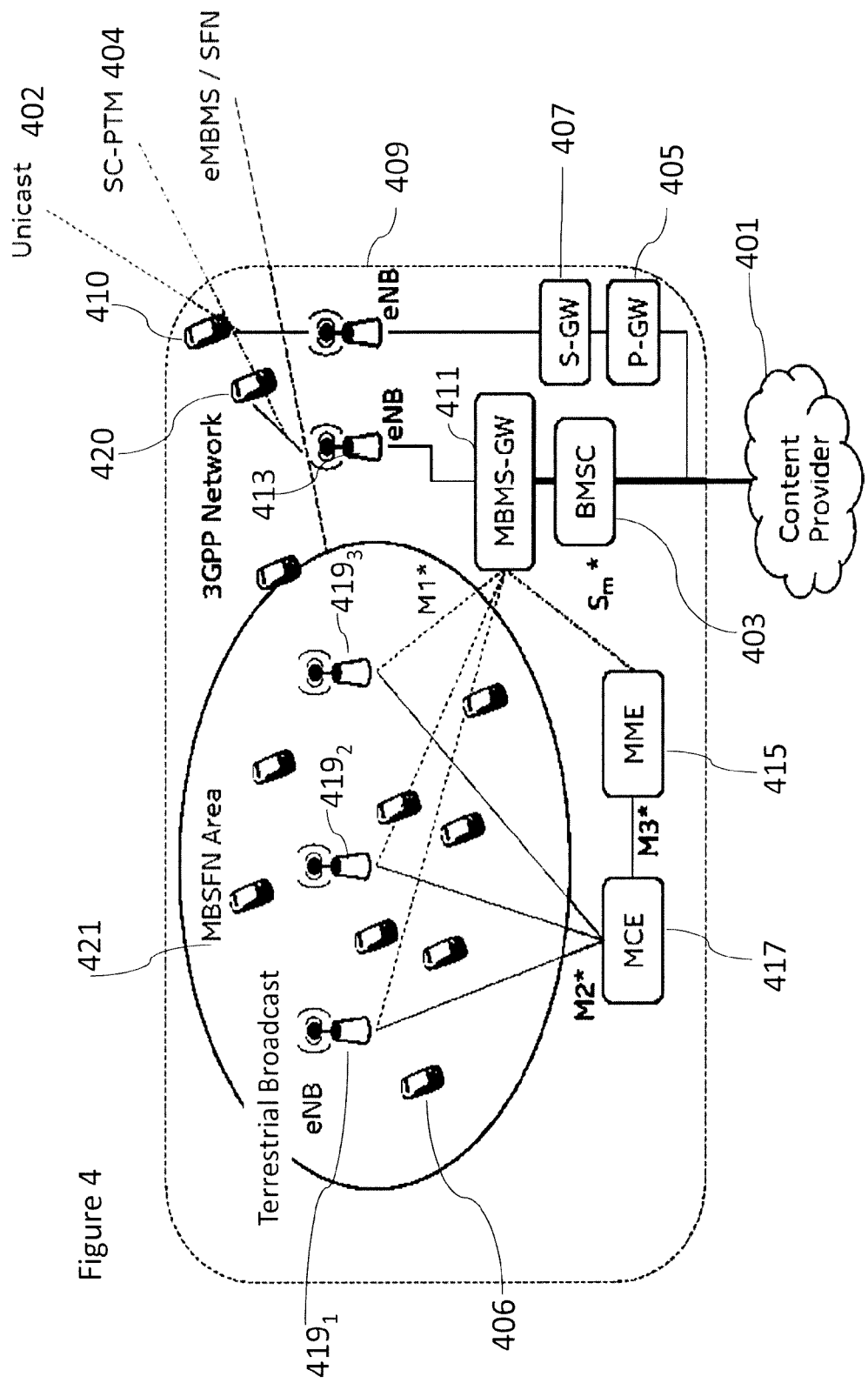
FIG. 4 shows example known multicast/broadcast architecture.

In other words FIG. 4 shows an architecture for the wide-area delivery of content using multicast/broadcast using multicast broadcast single frequency networks (MBSFN) areas where the same content is delivered over the air using synchronized time-frequency physical resources.

For delivery of such content to a smaller area, single cell-point-to-multipoint (SC-PTM) technology was developed.

One aim of content delivery in 5G may be for the simple and/or efficient reuse of unicast architecture. This may reduce infrastructure for the delivery of multicast/broadcast content.

Some of the embodiments described hereafter may improve the traditional MBMS architecture which was designed for the delivery of conventional broadcast content. Linear TV content consumption has been declining and the implementations described hereafter may natively support dynamic delivery of popular content using unicast and multicast capabilities efficiently. This may be without significant additional infrastructure requirements from the network operators' perspective.

The MBMS architecture in 3GPP has been an add-on feature which requires new network entities and interfaces and has a terrestrial broadcast of linear TV approach in mind. As discussed above some embodiments may aim to better fit new service models such as 'over-the-top' media and internet-of-things (IoT) services. Some embodiments may be able to implement and service the consumption of linear TV. An example use case for these embodiments may be the consumption of multimedia feeds during live events by large population of users. With dynamic provisioning of live content through various social media applications, there are emerging trends of 'new media content' that is being increasingly consumed in a linear manner (for e.g., Facebook/Twitter/YouTube Live feature). Some embodiments as discussed in further detail later may be configured to provide network capability for delivering multicast content efficiently for such use cases.

Some embodiments may enable support for multicast/broadcast in 5G with a minimal footprint over the unicast architecture. Some embodiments may make multicast/broadcast support an integral part of the 5G system. Some embodiments may provide an efficient transport of multicast traffic.

Some embodiments as discussed herein, in contrast to eMBMS and its MBMS operation on demand (MooD) architecture, which is used to setup MBMS session based on UEs demand, may enhance a UE's context with information about network functions serving multicast traffic for this UE and multicast group. Some embodiments may use a PDU (protocol data unit) session modification procedure to manage the UE context update, and to manage control and user plane network functions for multicast traffic delivery.

In some embodiments either a UE or a UPF (user plane function) triggers a PDU session modification procedure. This may be in response to a user plane event such as a request to transmit a multicast listener's report (MLR) with a multicast address for which UE does not yet have a context by higher layers in the UE or in response to the reception of the MLR by an existing UPF.

It should be noted that there may be network functions in the network used to serve UE's unicast traffic, i.e. SMF (session management function), UPF, AMF (access and mobility function) etc. These functions may be referred to as unicast network functions. During the PDU session modification procedure, the unicast SMF serving the UE may check whether a context for the multicast group exists in the network. If the context does not exist, then the context is created. The network may decide whether what unicast network function is going to be used and what new function or functions may be instantiated to provide the transport of multicast traffic. The result of PDU session update for multicast transport support may be a modified network slice with new network functions instantiated. The set of network functions providing the multicast transport capability can be described as a sub-slice of a network slice such as eMBB slice, which then comprises a unicast network sub-slice and a multicast network sub-slice. The sub-slices may not be independent but they may share certain network functions, such as AMF.

Figure 5:
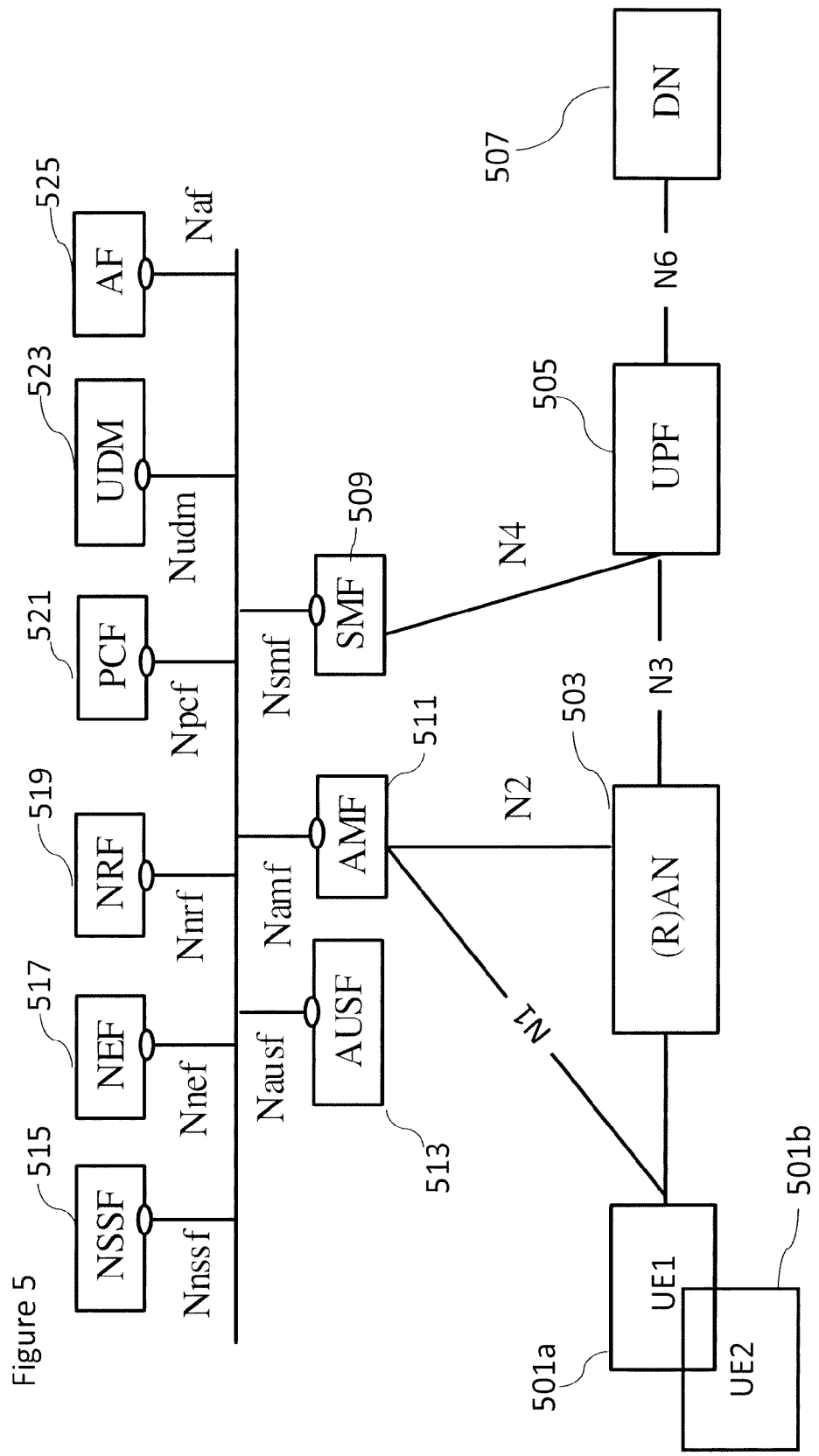
FIG. 5 shows an example 5G NR architecture suitable for implementing some embodiments.

With respect to FIG. 5 an example 5G system architecture comprising enhancements to enable content delivery via multicast is shown.

The architecture shows the User Equipment (UE) 501 connected to a (radio) access network ((R) AN) 503 at the access stratum, as well as an Access and Mobility Function (AMF) 511 at the non-access stratum. The RAN represents a base station using new RAT (radio access technology) and evolved LTE, for example a gNodeB (gNB), while an AN (access node) is a general base station including non-3GPP access, e.g., Wi-Fi.

The 5G core network (5GC) consists of various network functions (NFs). In FIG. 5 there are seven 5G core NFs. An access and mobility management function AMF 511, a Session Management Function (SMF) 509a, a Policy Control Function (PCF) 521, an Application Function (AF) 525, an Authentication Server Function (AUSF) 513, a User Plane Function (UPF) 505, User Data Management (UDM) 523, a NF Repository Function (NRF) 519, a Network Exposure Function (NEF) 517 and a Network slice selection function (NSSF) 515.

The functionality of these network functions is generally described with respect to 3GPP TS 23.501 and is not discussed in further detail hereafter. This document is hereby incorporated by reference.

The PDU session anchor UPF 505 (i.e. the UPF interfacing data network at the N6 reference point) is configured to act as the multicast router/switch of a corresponding IP PDU session type. The design principle of the N6 reference point is to introduce multicast IP datagrams in ingress traffic and thus avoid a need for a dedicated interface to receive multicast traffic in a 5G network.

In the arrangement shown in FIG. 5, a first UE 501a and a second UE 501b are shown. In this example, one UPF 505a is configured to serve unicast and multicast traffic. There is a dedicated tunnel at N3 reference point, e.g. a dedicated tunnel for each multicast group is created between the UPF 505a and the (R) AN 503. Data from several multicast groups may be multiplexed in one tunnel. The Data Network DN 507 may be configured to provide data to the UPF 505a via the N6 reference point.

N1 is the interface between the UE and the AMF.
N2 is the interface between the (R)AN and the AMF.
N3 is the interface between the (R)AN and the UPF.
N4 is the interface between the UPF and the SMF.
N6 is the interface between the UPF and the DN.

Figure 6:
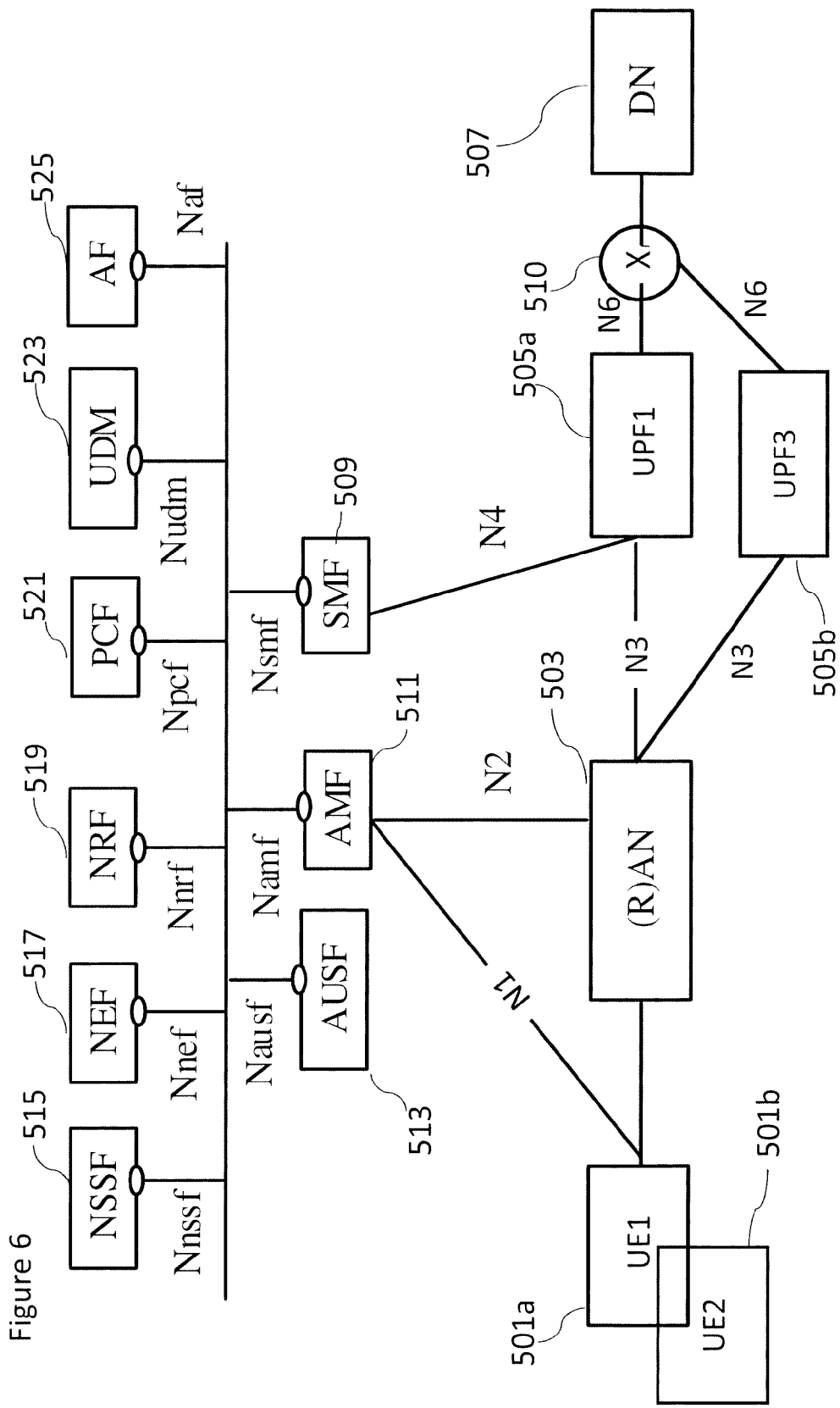
FIG. 6 shows a modification to the architecture of FIG. 5.

A modification to the arrangement shown in FIG. 5 is shown in FIG. 6. In the arrangement of FIG. 6 a further UPF2 505b is provided which is able to handle multicast traffic of a network area or a set of multicast groups. The UPF2 has a N3 connection to the (R)AN 503 and an N4 connection to the SMF 509a. A switch or router 510 is provided between the DN 507 and the respective first and second UPFs.

Figure 7:
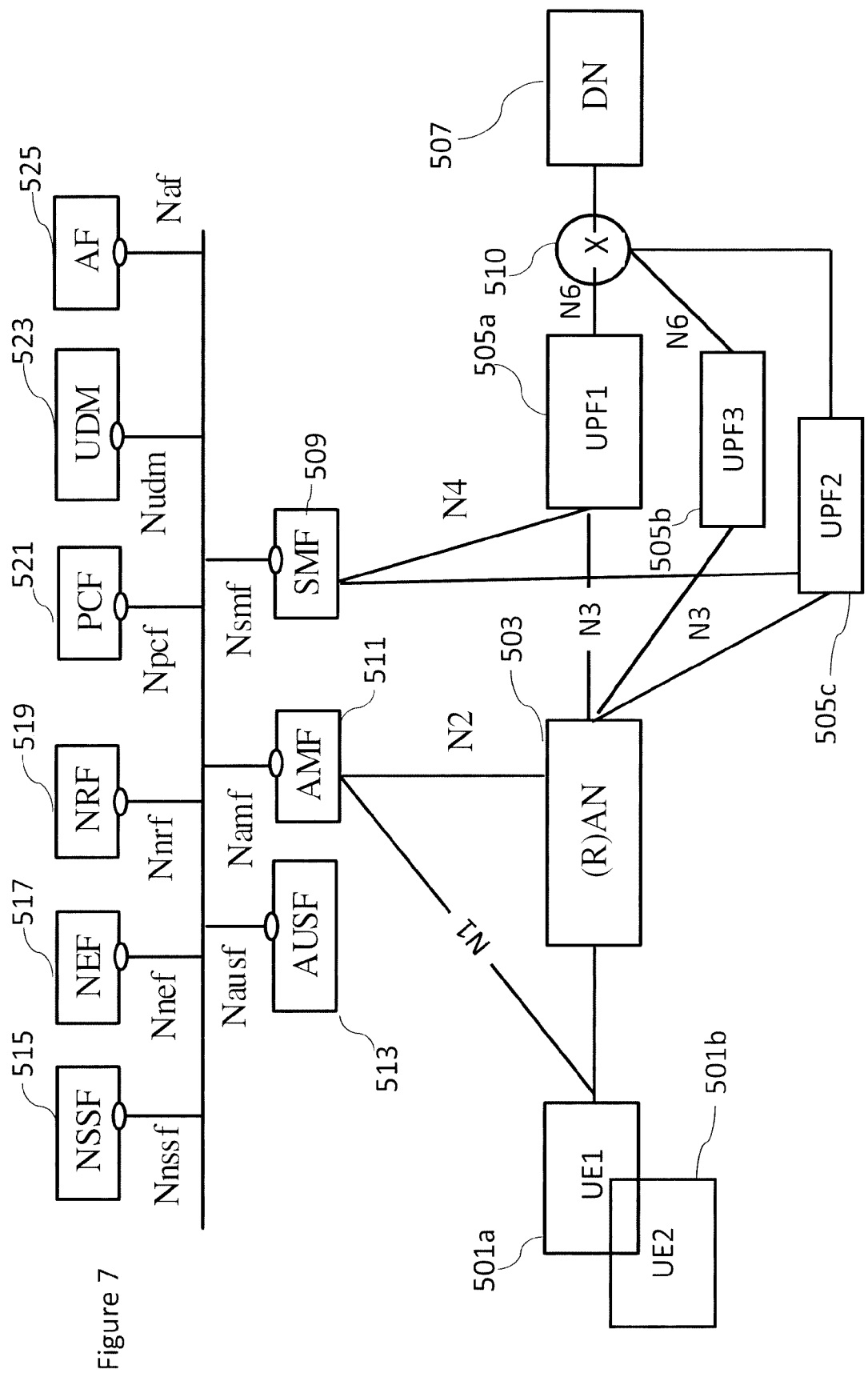
FIG. 7 shows a modification to the architecture of FIG. 6.

A modification to the arrangement shown in FIG. 6 is shown in FIG. 7. In this arrangement, a further UPF3 505c is provided which has a N4 connection with a second SMF 509b. The UPF3 has a N3 connection to the (R)AN 503 and a N6 connection via the switch or router with the DN. There may be a plurality of unicast UPFs, and a dedicated UPF for multicast traffic. For example UPF1 and 2 may be unicast UPF and the UPF 2 may be a multicast UPF. This is by way of example only and any of the UPFs may provide either the multicast or the unicast support or both. This alternative demonstrates that some embodiments may have flexibility of deployment. In addition to deployment of a dedicated UPF function, one or more other network functions may be instantiated for unicast and multicast traffic management, e.g. a SMF.

For simplicity, there may be only one N3 tunnel for a multicast group to which UEs are listening at a single (R)AN node. There may be other N3 tunnel(s) to other RAN node(s) for the same multicast group.

In some embodiments, information about a UE's interest in data reception from multicast groups (SSM (source specific multicast), ASM (any source multicast)) is stored in a multicast context with associations to the context of all UEs receiving or having an interest to receive from the same multicast group. The multicast context or parts of multicast context can be stored at one or more network functions serving multicast traffic. A separate context may store information about UE's interested (the association information) and information about network resources allocated to serve the traffic which can include for example a list of NFs (network functions). The NRF may store information about network functions, which can serve or are currently serving multicast traffic. The information stored by the NRF may be a part of the multicast context.

If a UDSF (unstructured data storage function) is present in the network either as stand-alone function or collocated with the UDR (Unified data repository) then the multicast context can be stored in UDSF. The UDF is an entity or NF in the control plane of 5CG. UDSF and UDR are data storage architectures. The UDR may be a control function. The UDR can be collocated with a NF when a UDR serves a single NF. It should be appreciated that there may be a large variety of deployment options for UDR and UDSF.

Figure 8A:
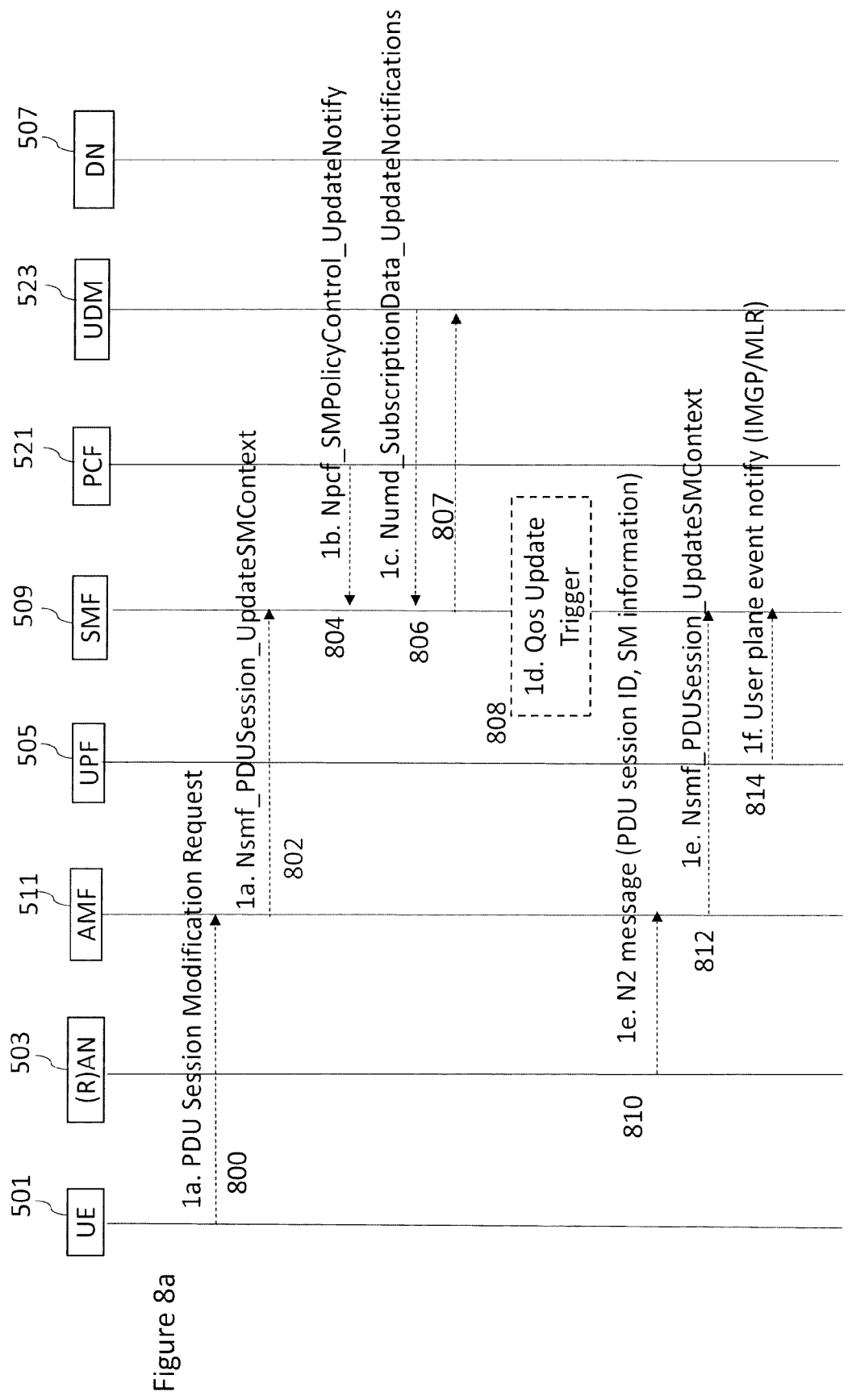
FIGS. 8a to 8c shows a flowchart of an example method for supporting multicast/broadcast in a 5G NR architecture according to some embodiments.

A session modification procedure for multicast context establishment will now be described with reference to FIGS. 8a to c. Reference is made first to FIG. 8a.

The procedure may be triggered by following events:

In step 800 which is a UE initiated modification, the UE sends a session modification request to the AMF upon receiving an indication from upper layers (e.g. ICMP (Internet control message protocol) v6) about UE's interest in the reception of multicast data. The indication from upper layers could be a request to send MLR and a detection of the request by lower layers in cellular modem (e.g. SDAP (service data adaption protocol) or PDCP (packet data convergence protocol) in NR). By way of example only the UE may initiate a PDU session modification procedure by the transmission of a message. By way of example only, that message may be a NAS (non-access stratum) message containing N1 SM (session management) container (PDU Session Modification Request, PDU Session ID, multicast group information). The multicast group information may be entire MLR or part of MLR information. The message may of course take different forms. This is transmitted to the AMF 511.

Depending on the access type and the state of the UE, the message may be preceded by another procedure. For example, that procedure may be service request procedure. For example, if the UE was in a CM (connection management)-IDLE state, the example SM-NAS message may be preceded by a Service Request procedure.

In some embodiments, the message is forwarded by the (R)AN to the AMF with an indication of user location Information.

In step 802, the AMF may sent a message to the SMF to cause an update. The message may be any suitable message and may be such as to invoke a context update. In one embodiment, the message may take the form of a Nsmf PDU Session Update SM Context (PDU Session ID, N1 SM container (PDU Session Modification Request)) to the SMF 509. In this document, an N precedes the reference point numbers and service based interfaces in line with proposals in 3GPP but should be appreciated that this is by way of example only.

A PDU session modification procedure may be triggered for the addition and/or creation of a multicast context. The triggering event may, for example, be the UE's interest to receive/transmit data from a multicast group. The triggering event may be received by the UE's modem in a control plane, e.g. API (application programming interface), or the triggering event may be detected in the modem in the user plane. For example the modem detects a request to transmit a MLR of MLDv2 (Multicast Listener Discovery Version 2). If the procedure is triggered for the addition/creation of a multicast context, the PDU Session Modification Request includes information of the multicast group(s), e.g. the request may include whole MLR or its part. The MLR may be sent periodically. The UE may initiate the procedure only if the UE's status with regard to its interest in multicast groups is changing. When UE knows the multicast context has been successfully added/created, the modem may still receive the MLR from upper protocol layers but it may discard the MLR. The may be an implementation option or a UE and/or network configuration option.

The QoS parameters which a UE provides for QoS session modification may be any suitable parameter.

Alternatively or additionally to steps 800 and 802, the following steps may be performed.

Step 804 is a SMF requested modification. The PCF will update the SMF about for example an update or change in service operation. By way of example only, this update may take the form of a Npcf_SMPolicyControl_UpdateNotify service operation. This message may notify the SMF about the modification of policies. This may for example have been triggered by a policy decision or upon AF requests.

Step 806 may be in addition or an alternative to step 804. In this step, the UDM may update the SMF. This may be a SMF requested modification. The UDM may update the subscriber data. In some embodiments, the UDM may update the subscription data of SMF by a message such as a Nudm_SubscriberData_UpdateNotification (SUPI, Subscription Data).

In step 807, the SMF may update the subscription data and acknowledges the UDM by returning an acknowledgement. For example the acknowledgement may comprise the SUPI.

In step 808 which may be in addition or as an alternative to any one or more of the preceding steps there may be a SMF requested modification. The SMF may decide to modify the PDU Session. This procedure may be alternatively or additionally triggered based on a locally configured policy in the SMF.

If the SMF receives any one or more of the triggers in steps 804 to 808, the SMF will start a PDU session modification procedure. This may be a SMF requested PDU Session modification procedure.

As an alternative to one or more of the following steps, there may be an access node initiated modification. For example in step 810, an access node may transmit a message to the AMF. This message may have a PDU session ID and/or SM information. For example, if notification control is configured for a GBR (guaranteed bit rate) flow, the (R)AN may determine that the QoS targets of the flow cannot be fulfilled. In that case, the (R)AN may send a N2 message (PDU Session ID, N2 SM information) to the AMF. The N2 SM information may comprise one or more of the QFI (QoS flow identifier), user location Information and a notification indicating that the QoS targets cannot be fulfilled.

The AMF may send a message to the SMF in step 812. This message may be to invoke a PDU session update. The message may be a Nsmf_PDUSession_UpdateSMContext (N2 SM information).

Step 814 may be instead of the preceding steps or may be in addition to any one or more of those steps. Step 814 may be a SMF requested modification. This may be based on a UPF trigger. The UPF may send a message to the SMF. The UPF may inform SMF about a user event. That user event may for example be the reception of a MLR. The UPF may for example send the notification if it receives the MLR in a PDU session for which UE does not have the multicast context for a multicast group. Otherwise, the UPF may not send the notification because the MRL may be retransmitted by UE.

It should be appreciated that in some embodiments, steps 800 and 802 or steps 804 to 807, or step 808 or step 810 and 812 or step 814 may be performed. In some implementations only one of these options may be supported. In some embodiments, all of the options are supported. In some embodiments only two or more of the options are supported.

Figure 8B:
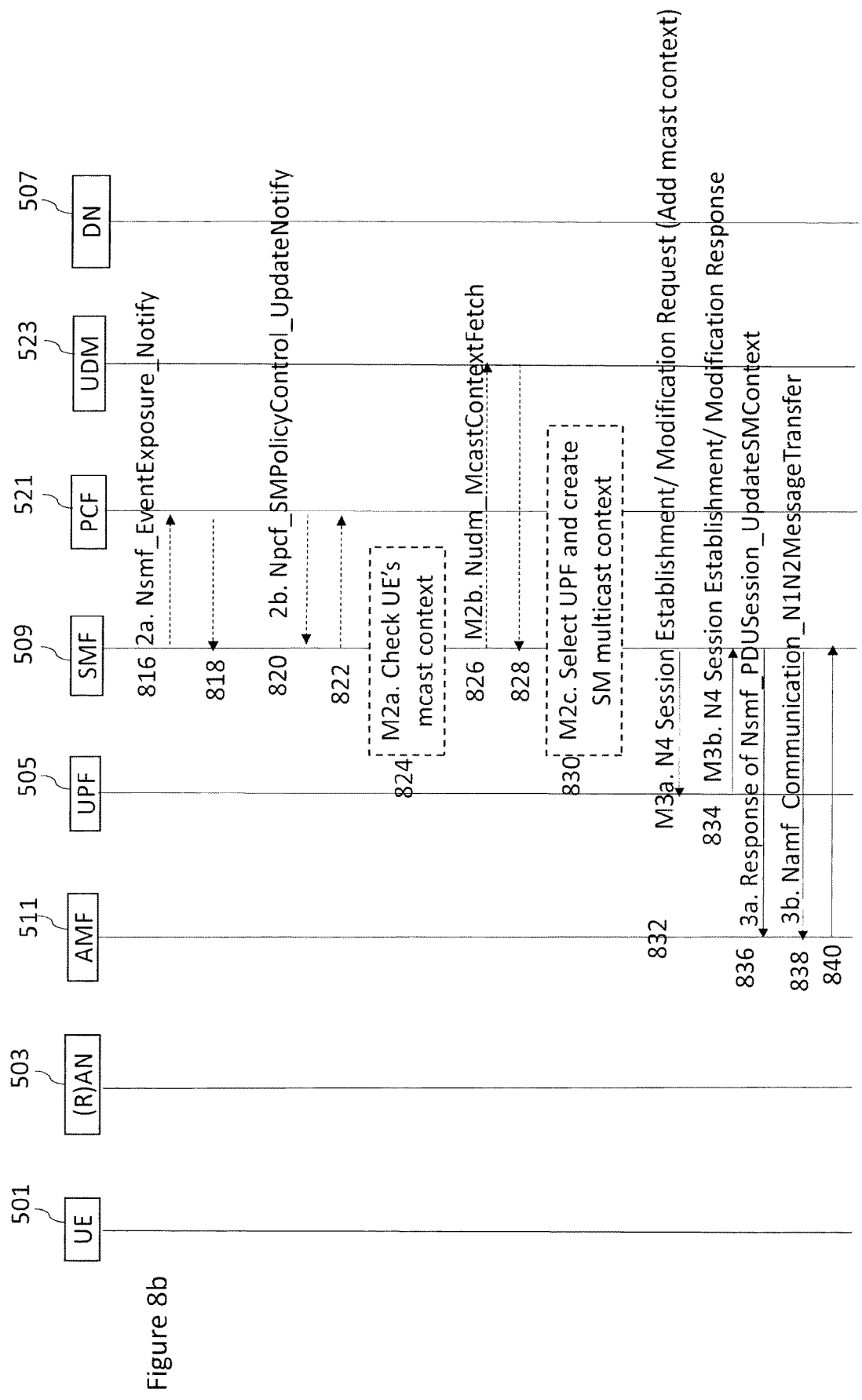

Reference is now made to FIG. 8b which follows on from the method shown in FIG. 8a.

In step 816, the SMF may need to report some subscribed event to the PCF. This may be by invoking a notify operation. By way of example, the SMF may send a Nsmf_EventExposure_Notify service operation message to the PCF.

An acknowledgement may be provided by the PCF in step 818.

In step 820, the PCF may provide new policy information to the SMF. This may be by invoking an update notification. By way of example, the PCF may invoke a Npcf_SMPolicyControl_UpdateNotify service operation.

Step 820 may be skipped if PDU Session modification procedure is triggered by step 804 or step 808. If dynamic policy and control charging PCC is not deployed, the SMF may apply local policy to decide whether to change the QoS profile.

An acknowledgement may be provided by the SMF in step 822.

In the following, steps 832 to 848 may not be invoked when the PDU Session modification requires action only at an UPF (e.g. gating). The anchor UPF acts as gateway. The action may be to update policies for the gateway function of UPF. This may be relevant when the multicast context is updated in a way that the network changes the gateway policies to provide a different treatment to data send to a multicast group. There may be different flows in a multicast group, (i.e. defined by communication ports of upper layer protocols above IP).

Reference will now be made to steps 824 to 830. The SMF may search for the existence of a multicast context in the network. The multicast context can be stored locally in the SMF, and/or in a more centralized manner by, for example, the UDM or UDSF. If the multicast contexts are stored locally, then NRF may store information about SMFs handling multicast traffic (i.e. such SMFs store the multicast context locally). The SMF initiating the PDU session modification may need to communicate with the SMFs indicated in NRF to check whether the multicast context associated with the SSM or ASM addresses already exists. This may avoid a situation in which a RAN receives the same multicast traffic from two or more UPFs, which might lead to either multiple transmission of the same data over the air or more complex RAN implementation performing duplication detection.

In more detail, in step 824, the SMF checks whether it has a multicast context for the multicast group. This may be, for example, identified by a SSM and/or an ASM.

In step 826, the SMF attempts to fetch the multicast subscription data from UDM and/or the multicast context from UDSF.

An acknowledgement may be provided by the UDM in step 828. The acknowledgment will also include the multicast context if it exists in UDM.

In step 830, if the multicast context does not exist in the network, the SMF creates the SM multicast context. This step may comprise one or more of PCF selection, communication with the PCF for policy control and event exposure. This may be similar to PDU session creation procedure.

In step 832, a session establishment or modification request may be sent from the SMF to the selected UPF. The request may be a N4 Session Establishment/Modification Request. The selected UPF may be different that the UPF which sent the notification in step 814. If a different UPF is used to handle the multicast traffic, then both UPFs need to be updated. (For simplicity this is not shown in the message flow of FIGS. 8*a-c*). The UPF, which sent the notification, may need to be updated with UE's context including the multicast context part. Thus session establishment or modification request may provide one or more of packet detection, enforcement and reporting rules to be installed on the UPF for this PDU Session. If CN (core network) tunnel information is allocated by the SMF, this information be provided to the UPF in this step.

In step 834, the UPF acknowledges the message. For example the UPF may send an N4 Session Establishment/Modification Response. If CN tunnel information is allocated by the UPF, the CN tunnel information is provided to SMF in this step.

In step 836, for a UE or AN initiated modification, the SMF responds to the AMF with update information. This may comprise one or more of PDU session identifier, QoS profile information and aggregate maximum bit-rate. This may be via a Nsmf_PDUSession_UpdateSMContext (N2 SM information (PDU Session ID, QoS Profile, Session-AMBR), N1 SM container (PDU Session Modification Command (PDU Session ID, QoS rule, Session-AMBR))) message.

The update information may comprise the information that that AMF is to provide to the (R)AN. It may comprise the QoS profiles that were added, removed or modified. For example, the N2 SM information carries information that the AMF shall provide to the (R)AN.

The update information may alternatively or additionally comprise the information that that AMF is to provide to the UE. This may be a PDU session modification command to the UE. The N1 SM container may carries the PDU Session Modification Command that the AMF shall provide to the UE. The PDU Session modification command may comprise one or more of a PDU Session ID, information related to a multicast context such as N3 tunnel end-point information, QoS rules for multicast, multicast-AMBR, and the like.

In step 838, for SMF requested modification, the SMF invokes a message transfer command to the AMF. The message transfer command may include one or more of PDU Session ID, QoS profile information, aggregate maximum bit-rate and a PDU session modification command. The PDU Session modification command may comprise one or more of a PDU Session ID, information related to a multicast context such as N3 tunnel end-point information, QoS rules for multicast, multicast-AMBR, and the like.

This message transfer from the SMF to the AMF may be via a Namf_Communication_N1N2MessageTransfer (N2 SM information (PDU Session ID, QoS Profile, Session-AMBR), N1 SM container (PDU Session Modification Command (PDU Session ID, QoS rule, Session-AMBR))).

If the UE is in CM (connection management)-IDLE state and an ATC is activated, the AMF updates and stores the UE context based on the messaging of step 838, then steps 842 to 848 may be omitted.

When the UE is reachable e.g. when the UE enters CM-CONNECTED state, the AMF forwards a message to synchronize the UE context with the UE. That may be a N1 message.

An acknowledgement may be provided by the AMF in step 840 to the message of step 838.

Figure 8C:
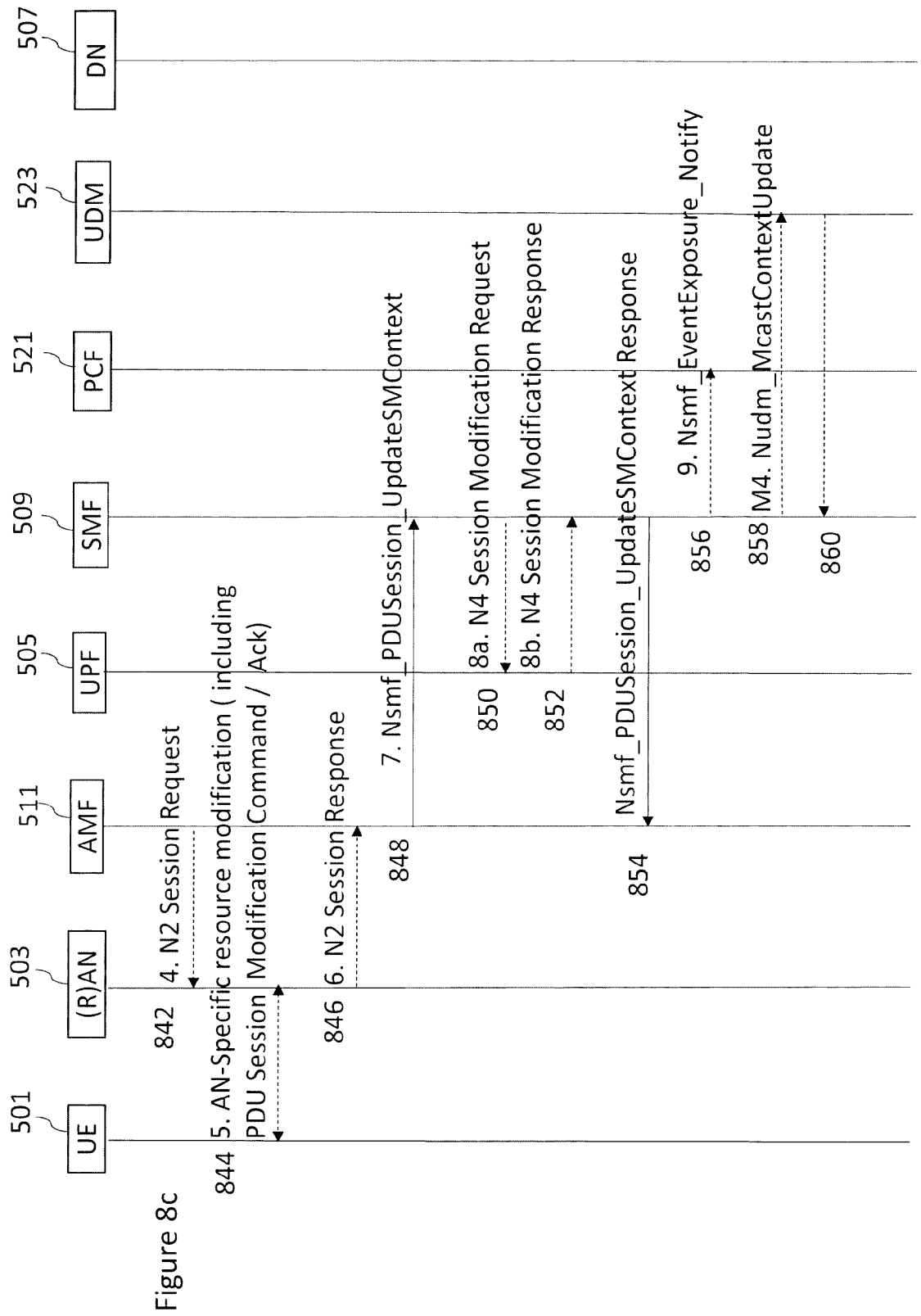

Reference is now made to FIG. 8*c*.

In step 842, the AMF may send a PDU session request to the (R)AN. This may comprise one or more of the SM information received from SMF and the PDU Session ID. The message may be a N2 PDU Session Request (N2 SM information received from SMF, NAS message (PDU Session ID, N1 SM container (PDU Session Modification Command))) Message to the (R)AN.

The (R)AN may allocate resources for the multicast context. If the multicast context already exists in (R)AN, i.e. there are other UEs receiving multicast content associated with the multicast context in (R)AN, the UE's context in (R)AN is updated but the N3 tunnel may be remain the same.

In step 844, the (R)AN may issue an AN specific signalling exchange with the UE that is related with the information received from SMF. For example, in case of a 3GPP RAN, an RRC Connection Reconfiguration may take place with the UE modifying the necessary RAN resources related to the PDU Session. In the case when the PDU session is updated due to the multicast context addition/creation, the (R)AN configures the UE with a set of unicast and multicast bearers used to transfer data over the air for the multicast context. Multicast bearers may be received by multiple UEs.

The UE acknowledges the PDU Session Modification Command. The UE may for example send a NAS message (PDU Session ID, N1 SM container (PDU Session Modification Command Ack)) message.

In step 846, the (R)AN may acknowledge PDU session request of step 842 by sending an acknowledgement to the AMF. The acknowledgement information may comprise one or more of QFI(s), RAN tunnel information, PDU session identifier, and user location information. The message may be a N2 PDU Session Ack (N2 SM information (QFI(s), RAN tunnel information, PDU Session ID), NAS message, User location Information) Message to the AMF.

In the case of dual connectivity, if one or more QFIs were added to the PDU session, the master RAN node may assign one of these QFIs to a RAN node which was not involved in the PDU Session earlier. In this case the RAN tunnel information includes a new N3 tunnel endpoint for QFIs assigned to the new RAN node. Correspondingly, if one or more QFIs were removed from the PDU Session, a RAN node may not be involved in the PDU session anymore, and the corresponding tunnel endpoint is removed from the RAN tunnel information.

In case when the PDU session update is used to add/create a multicast context, the (R)AN may need to (re)allocate N3 tunnel end-point information and send the information in a message to the AMF. This may be for example an N2 PDU Session Ack message. For example, the allocation of N3 tunnel end-point information is needed when a unicast tunnel is used on N3 for the multicast context. The allocation of a N3 tunnel end-point information is not necessary if N3 is using multicast tunnelling, in which case the (R)AN joins the IP multicast group based on the information received in step 842.

In step 848, the AMF forwards one or more of the SM information, the user location Information, and a PDU session modification command acknowledgment received from the AN to the SMF, This may be via a Nsmf_PDUSession_UpdateSMContext service operation. The Nsmf_PDUSession_UpdateSMContext service operation may provide N2 SM information, the user location Information and the N1 SM container (PDU Session Modification Command Ack).

In step 850, the SMF may update the sessions of the UPF(s) that are involved by the PDU Session modification by sending a modification request to the UPF. The modification request may be a N4 Session Modification Request (N4 Session ID) message to the UPF.

It should be appreciated that the UPF that are impacted in the PDU session modification procedure may depend on the modified QoS parameters and/or on the deployment. For example in case where the session AMBR of a PDU Session with an UL CL (communication link) changes, only the UL CL is involved.

In step 852, the UPF sends a response to the SMF. The response may be a N4 Session Modification Response.

If the SMF interacted with the PCF in step 804 or in any of steps 814 to 830, the SMF may notify the PCF whether the PCC decision could be enforced or not in step 856. This may be done by invoking a Nsmf_EventExposure_Notify service operation.

The SMF may notify any entity that has subscribed to the user location information related to PDU Session change. This is represented by step 854 where the SMF sends a context response message to the AMF. This may be a Nsmf_PDUSession_UpdatesSMContect Response.

In step 858, the SMF stores the multicast context in the UDM. Other SMFs can fetch this context for example in in step 828 (of a subsequent operation) which is schematically represented by step 860.

In implementing some embodiments as described herein by using the user plane event in either the UE or the UPF in the triggering of the multicast PDU session update with the multicast context, it may be possible to minimize or remove entirely the need for eMBMS middleware. This may be a simplification of the network architecture.

Some embodiments allow for a dedicated UPF which may be used to handle multicast traffic. This may provide advantages for network slicing.

In some of the embodiments, the switching between unicast and multicast can be performed at the transport layer using HTTP2 over multicast QUIC, which is transparent to HTTP application, or at the application layer. The HTTP client may receive an advertisement of a multicast QUIC (quick UDP Internet connections) session for HTTP transport including an IP multicast address. The HTTP client (e.g. implemented as a software library) may use operating system (OS) calls to join an IP multicast group. As the result, the ICMP protocol layer sends a MLR. The MLR is the trigger. So, embodiments may allow the switch between unicast and multicast to happen when connectivity is provided by 5G. Some embodiments may provide a simple and efficient mechanism to deliver multicast content, with minimal overhead over the unicast architecture.

The example embodiments have been in the context of an example 5G system. It should be appreciated that this is by way of example only and other embodiments may be used in with other 5G systems as well as any other suitable system. As such it should be appreciated that messages are by way of example and the exact form of the messages will be dependent on the system used. It should be appreciated that the names of the functions may be dependent on the system in question. Different architectures with which alternative embodiments may be used may combine the functions of two or more functions and/or divide one or more functions between one or more further or different functions.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of an unlicensed spectrum network, similar principles maybe applied in relation to other examples of networks. It should be noted that other embodiments may be based on other cellular technology other than LTE or on variants of LTE. For example, some embodiments may be used with so-called 5G New Radio or MulteFire. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus of a core network, the apparatus comprising at least one processor and at least one memory including computer code for one or more network functions, the at least one memory and the computer code configured, with the at least one processor, to cause the apparatus at least to:
   receive a protocol data unit session modification request sent by a user equipment, the protocol data unit session modification request comprising information of a multicast group the user equipment has an interest in receiving multicast data from;
   determine, based on the information of the multicast group, that a protocol data unit session for a user equipment is to be updated to add or modify a multicast context for the multicast group;
   determine that the multicast context for the multicast group does not exist in the core network;
   obtain the multicast context for the multicast group; and
   provide the multicast context for the multicast group to the user equipment which causes the user equipment to receive multicast data associated with the multicast group.

2. An apparatus as claimed in claim 1, wherein the at least one memory and the computer code are further configured, with the at least one processor, to cause the apparatus at least to receive the protocol data unit session modification request from the user equipment, the protocol data unit session modification request initiating updating of the protocol data unit session of the user equipment to add or modify multicast context for the multicast group.

3. An apparatus as claimed in claim 1, wherein the at least one memory and the computer code are further configured, with the at least one processor, to cause the apparatus to initiate updating of the protocol data unit session of the user equipment to add or modify multicast context for the multicast group.

4. An apparatus as claimed in claim 1, wherein the at least one memory and the computer code are further configured, with the at least one processor, to cause the apparatus to initiate updating of the protocol data unit session to add or modify multicast context for the multicast group in response to a trigger event.

5. An apparatus as claimed in claim 1, wherein the multicast context includes information about the user equipment's interest in receiving data from the multicast group and further includes associations to a context of at least one other user equipment receiving or having an interest in receiving data from the multicast group.

6. An apparatus as claimed in claim 4, wherein the triggering event is a user plane event comprising reception of a multicast listener report.

7. An apparatus as claimed in claim 1, wherein the at least one memory and the computer code are further configured, with the at least one processor, to cause the apparatus to fetch multicast subscription data.

8. An apparatus as claimed in claim 1, wherein the at least one memory and the computer code are further configured, with the at least one processor, to cause the apparatus to transmit a session management update message with the multicast context for the multicast group, the multicast context for the multicast group comprising at least of: session management information for at least one radio access node and at least the user equipment.

9. An apparatus as claimed in claim 8, wherein the session management information comprises at least one of: a protocol data unit session identifier for the protocol data unit session, a multicast group identifier associated with the multicast group, at least one quality of service profile, core network tunnel information, a single network slice selection assistance information, and session-aggregate maximum bit rate information.

10. A user equipment comprising at least one processor and at least one memory including computer code for one or more programs, the at least one memory and the computer code configured, with the at least one processor, to cause the user equipment at least to:
   send, towards an access and mobility management function of a core network, a protocol data unit modification request to update a protocol data session for the user equipment, the protocol data unit modification request comprising information of a multicast group the user equipment has an interest in receiving multicast data from; and receive a message comprising at least an indication that a multicast context has been one of added to and created for the protocol data session for the user equipment; and receive multicast data from the multicast group.

11. The user equipment as claimed in claim 10, wherein said protocol data unit modification request comprises a user plane packet comprising at least an indication of at least the interest.

12. The user equipment as claimed in claim 10, wherein the at least one memory and the computer code are further configured, with the at least one processor, to cause the user equipment to cause the protocol data unit modification request to be sent in response to a multicast listener report for which the user equipment does not have the multicast context.

13. The user equipment as claimed in claim 10, wherein the at least one memory and the computer code are further configured, with the at least one processor, to cause the user equipment to receive a multicast listener report after the multicast context has been one of added to and created for a protocol data unit session for the user equipment and then to discard the multicast listener report.

14. A method comprising:
receiving a protocol data unit session modification request sent by a user equipment, the protocol data unit session modification request comprising information of a multicast group the user equipment has an interest in receiving multicast data from;

determining, based on the information of the multicast group, that a protocol data unit session for a user equipment is to be updated to add or modify multicast context for the multicast group;

determine that the multicast context for the multicast group does not exist in a core network;

obtain the multicast context for the multicast group; and provide the multicast context for the multicast group to the user equipment which causes the user equipment to receive multicast data associated with the multicast group.

* * * * *